United States Patent [19]

Chang et al.

[11] 3,894,105

[45] July 8, 1975

[54] PRODUCTION OF DURENE

[75] Inventors: Clarence D. Chang, Princeton, N.J.;
Anthony J. Silvestri, Morrisville, Pa.; Robert L. Smith, Hopewell, N.J.

[73] Assignee: Mobil Oil Corporation, New York, N.Y.

[22] Filed: Aug. 9, 1973

[21] Appl. No.: 387,221

[52] U.S. Cl. ............. 260/668 R; 208/135; 208/141; 260/673; 260/673.5; 260/676 R; 260/682
[51] Int. Cl. .............................................. C07c 1/20
[58] Field of Search ......... 208/135, 141; 260/668 R, 260/449 R, 449 M, 449 L, 449.5, 671 C, 671 M, 671 R, 673, 673.5, 682, 676 R; 252/455 Z

[56] References Cited
UNITED STATES PATENTS

| 3,728,408 | 4/1973 | Tobias | 260/668 C |
| 3,751,504 | 8/1973 | Keown et al. | 260/672 T |
| 3,751,506 | 8/1973 | Burress | 260/671 R |
| 3,755,483 | 8/1973 | Burress | 260/671 R |

*Primary Examiner*—C. Davis
*Attorney, Agent, or Firm*—Charles A. Huggett; Michael G. Gilman

[57] ABSTRACT

Improvement in the conversion of compounds of the formula:

$$CH_3 - X$$

where X is hydroxyl, lower alkoxy, thiol, alkylthio, amino, mono or dialkyl amino, halogen, or cyano in contact with a particular type of aluminosilicate zeolite at elevated temperatures to aromatics by operating at elevated pressures, preferably about 20 to 200 atmospheres in order to maximize tetramethyl benzene, and particularly durene, production. The catalyst is a zeolite having a silica to alumina ratio of at least about 12 and a constraint index of about 1 to 12.

8 Claims, No Drawings

PRODUCTION OF DURENE

This invention relates to conversion of methyl compounds to more desirable products. It more particularly refers to the conversion of methanol and/or its analogues to tetramethyl benzenes in high yield. There has recently been discovered a certain novel class of crystalline aluminosilicate zeolites which have been shown to have most unusual properties. These catalysts induce profound transformations of aliphatic hydrocarbons to aromatic hydrocarbons in commercially desirable yields. Although they have unusually low alumina contents, i.e. high silica to alumina ratios, they are very active even when the silica to alumina ratio exceeds 30. The activity is surprising since the alumina in the zeolite framework is believed responsible for catalytic activity. These catalysts retain their crystallinity for long periods in spite of the presence of steam at high temperature which induces irreversible collapse of the framework of other zeolites, e.g. of the X and A type. Furthermore, carbonaceous deposits, when formed, may be removed by burning at higher than usual temperatures to restore activity.

An important characteristic of the crystal structure of this class of zeolites is that it provides constrained access to, and egress from, this intracrystalline free space by virtue of having a pore dimension greater than about 5 Angstroms and pore windows of about a size such as would be provided by 10-membered rings of oxygen atoms. It is to be understood, of course, that these rings are those formed by the regular disposition of the tetrahedra making up the anionic framework of the crystalline aluminosilicate, the oxygen atoms themselves being bonded to the silicon or aluminum atoms at the centers of the tetrahedra. Briefly, the preferred type catalyst useful in this invention posess, in combination: a silica to alumina ratio of at least about 12; and a structure providing constrained access to the crystalline free space.

The silica to alumina ratio referred to may be determined by conventional analysis. This ratio is meant to represent, as closely as possible, the ratio in the rigid anionic framework of the zeolite crystal and to exclude aluminum in the binder or in cationic form within the channels. Although catalyst with a silica to alumina ratio of at least 12 are useful, it is preferred to use catalysts having higher ratios of at least about 30. Such catalysts, after activation, acquire an intracrystalline sorption capacity for normal hexane which is greater than that for water, i.e. they exhibit "hydrophobic" properties. It is believed that this hydrophobic character is advantageous in the present invention.

The type zeolites useful in this invention freely sorb normal hexane and have a pore dimension greater than about 5 Angstroms. In addition, the structure must provide constrained access to larger molecules. It is sometimes possible to judge from a known crystal structure whether such constrained access exists. For example, if the only pore windows in a crystal are formed by eight membered rings of oxygen atoms, then access to molecules of larger cross section than normal hexane is excluded and the zeolite is not of the desired type. Windows of ten-membered rings are preferred, although excessive puckering or pore blockage may render these catalysts ineffective. Twelve-membered rings do not generally appear to offer sufficient constraint to produce the advantageous conversions, although structures can be conceived, due to pore blockage or other cause, that may be operative.

Rather than attempt to judge from crystal structure whether or not a catalyst posesses the necessary constrained access, a simple determination of the "constraint index" may be made by passing continuously a mixture of equal weight of normal hexane and 3-methylpentane over a small sample, approximately 1 gram or less, of catalyst at atmospheric pressure according to the following procedure. A sample of the catalyst, in the form of pellets or extrudate, is crushed to a particle size about that of coarse sand and mounted in a glass tube. Prior to testing, the catalyst is treated with a stream of air at 1000°F for at least 15 minutes. The catalyst is then flushed with helium and the temperature adjusted between 550°F and 950°F to give an overall conversion between 10 percent and 60 percent. The mixture of hydrocarbons is passed at 1 liquid hourly space velocity (i.e. 1 volume of hydrocarbon per volume of catalyst per hour) over the catalyst with a helium dilution to give a helium to total hydrocarbon mole ratio of 4:1. After 20 minutes on stream, a sample of the effluent is taken and analyzed, most conveniently by gas chromatography, to determine the fraction remaining unchanged for each of the two hydrocarbons.

The "constraint index" is calculated as follows:

$$\text{Constraint Index} = \frac{\log_{10} (\text{fraction of n-hexane remaining})}{\log_{10} (\text{fraction of 3-methylpentane remaining})}$$

The constraint index approximates the ratio of the cracking rate constants for the two hydrocarbons. Catalysts suitable for the present invention are those having a constraint index from 1.0 to 12.0, preferably 2.0 to 7.0.

The class of zeolites defined herein is exemplified by ZSM-5, ZSM-11, ZSM-12, ZSM-21, TEA mordenite and other similar materials. Recently issued U.S. Pat. No. 3,702,886 describing and claiming ZSM-5 is incorporated herein by reference.

ZSM-11 is more particularly described in U.S. Pat. No. 3,709,979, the entire contents of which are incorporated herein by reference.

ZSM-12 is more particularly described in West German Offenlagunschrifft No. 2,213,109, the entire contents of which are incorporated herein by reference.

ZSM-21 is more particularly described in U.S. Application, Ser. No. 358,192, filed May 7, 1973, and now abandoned, the entire contents of which are incorporated herein by reference.

TEA mordenite is more particularly described in U.S. Application Ser. No. 130,442 filed Apr. 11, 1971, the entire contents of which are incorporated herein by reference.

The specific zeolites described, when prepared in the presence of organic cations, are catalytically inactive, possibly because the intracrystalline free space is occupied by organic cations from the forming solution. They may be activated by heating in an inert atmosphere at 1000°F for 1 hour, for example, followed by base exchange with ammonium salts followed by calcination at 1000°F in air. The presence of organic cations in the forming solution may not be absolutely essential to the formation of this type zeolite; however, the presence of these cations does appear to favor the formation of this special type of zeolite. More generally, it is desirable to activate this type catalyst by base exchange with ammonium salts followed by calcination in air at about 1000°F for from about 15 minutes to about 24 hours.

Natural zeolites may sometimes be converted to this type zeolite catalysts by various activation procedures and other treatments such as base exchange, steaming, alumina extraction and calcination, in combinations. Natural minerals which may be so treated include ferrierite, brewsterite, stilbite, dachiardite, epistilbite, heulandite and clinoptilolite. The preferred crystalline aluminosilicates are ZSM-5, ZSM-11, ZSM-12, ZSM-21 and TEA mordenite, with ZSM-5 particularly preferred.

The catalysts of this invention may be in the hydrogen form or they may be base exchanged or impregnated to contain ammomium or a metal cation complement. It is desirable to calcine the catalyst after base exchange. The metal cations that may be present include any of the cations of the metals of Groups I through VIII of the periodic table. However, in the case of Group IA metals, the cation content should in no case be so large as to effectively inactivate the catalyst. For example, a completely sodium exchanged H-ZSM-5 is not operative in the present invention.

In a preferred aspect of this invention, the catalysts hereof are selected as those having a crystal density, in the dry hydrogen form, of not substantially below about 1.6 grams per cubic centimeter. It has been found that zeolites which satisfy all three of these criteria are most desired because they tend to maximize the production of gasoline boiling range hydrocarbon products. Therefore, the preferred catalysts of this invention are those having a constraint index as defined above of about 1 to 12, a silica to alumina ratio of at least about 12 and a dried crystal density of not less than about 1.6 grams per cubic centimeter. The dry density for known structures may be calculated from the number of silicon plus aluminum atoms per 1000 cubic Angstroms, as given, e.g. on page 11 of the ariticle on Zeolite Structure by W. M. Meier. This paper, the entire contents of which are incorporated herein by reference, is included in "Proceedings of the Conference on Molecular Sieves, London, April 1967," published by the Society of Chemical Industry, London, 1968. When the crystal structure is unknown, the crystal framework density may be determined by classical pyknometer techniques. For example, it may be determined by immersing the dry hydrogen form of the zeolite in an organic solvent which is not sorbed by the crystal. It is possible that the unusual sustained activity and stability of this class of zeolites is associated with its high crystal anionic framework density of not less than about 1.6 grams per cubic centimeter. This high density of course must be associated with a relatively small amount of free space within the crystal, which might be expected to result in more stable structures. This free space, however, is important as the locus of catalytic activity.

It is known in the art to convert aliphatic hydrocarbons to aromatic hydrocarbons by contacting such with an aluminosilicate molecular sieve as defined herein at about 650° to 1500°F at low space velocities. It is also known to dehydrate alcohols to ethers and/or olefins by contact of such alcohols with acid catalysts at elevated temperatures. Because of the fact that methanol only has one carbon atom, it has not in the past been convertible to hydrocarbon products, whether olefinic or otherwise, by acid catalyzed dehydration reaction - its only significant dehydration product being dimethyl ether.

Patent applications filed simultaneous herewith, Ser. Nos. 387,222, 387,223 and 387,224 disclose and claim the conversion of lower alcohols, ethers, carbonyl containing compounds and analogous materials to products having at least the same longest carbon to carbon chain length and a higher carbon to hetero atom ratio than their respective reactants, by contacting such with an aluminosilicate molecular sieve zeolite as defined herein at elevated temperature. Included in this disclosure is the conversion of alcohols and/or ethers to aromatic hydrocarbons, notably benzene, including alkylated benzenes such as toluene and xylenes.

It is an object of this invention to provide a novel process for the production of tetraalkyl benzenes.

It is another object of this invention to provide a process for producing tetramethyl benzenes, particularly durene.

It is a further object of this invention to provide a process for converting methanol to tetra-alkyl benzenes, particularly durene.

Other and additional objects of this invention will become apparent from a consideration of this entire specification including the claims hereof.

In accord with and fulfilling these objects, one aspect of this invention resides in contacting aliphatic compounds of the formula $CH_3 - X$, where X is hydroxyl, lower alkoxy, thiol, lower alkylthio, amino, mono alkyl amino, dialkyl amino, halogen or cyano, or mixtures thereof with each other or with other compounds, at a temperature of about 550° to 850°F, preferably 600° to 700°F, elevated pressure, preferably about 20 to 200, most preferably 30 to 60, atmospheres and a space velocity of about 0.1 to 100, preferably 0.5 to 50 WHSV with an aluminosilicate molecular sieve zeolite having a silica to alumina ratio of at least about 12 and a constraint index of about 1 to 12 which may be used alone or in a matrix. The contact may be batchwise or continuous but should be under such combination of conditions as to convert substantial quantities of the methyl reactant feed to tetramethyl benzenes of which the durene (1, 2, 4, 5 tetramethyl benzene) isomer predominates.

It is within the spirit and scope of this invention to further maximize the production of the desired tetramethyl benzene, particularly durene, product by resolving the product into its components, as for example by distillation, recovering the tetramethyl benzene (or durene) fraction, and recycling the remainder of the product back to the reaction zone. It is known that alkyl benzenes disproportionate to some equilibrium concentration at any given set of conditions. This fact has been advantageously used to produce various specific alkyl benzenes from other alkyl benzenes. In this particular case, this disproportionation is taken advantage of during methanol aromatization whereby combining these two steps into one. The catalyst may be in a fixed or fluidized bed as desired or required by the particular heat transfer and temperature control problems of each system. The zeolite catalyst hereof is suitably used in the hydrogen form but may be used in other forms. Preferably the zeolite is employed in a matrix, suitably an alumina matrix. Catalyst matrix particle sizes may vary with the particular operating conditions chosen but should be between about 12 and 325 mesh.

It is interesting to note that the conversion of alcohols, mercaptans, halides and/or amines to aromatic hydrocarbon is disclosed in Application Ser. No. 387,223 filed Aug. 9, 1973. The aromatic hydrocarbon product produced by that process has a rather wide range of individual aromatic compounds with benzene, toluene and $C_8$ aromatics predominating. Carrying out the special process of this invention causes the production of tetraalkyl benzenes to increase at the expense of other aromatic products while not significantly changing the total aromatics produced under any given set of operating conditions (pressure excluded). It is also interesting to note that while substantially any lower alcohol can be converted to aromatic hydrocarbons by the aforesaid process, production of predominantly tetramethyl benzenes in general and durene in particular are the result of using a methyl type reactant, particularly methanol or dimethyl ether, as aforesaid. Attempts to convert other, non-methyl, lower alcohols or ethers to predominantly tetraalkyl, particularly tetramethyl, benzenes have not met with particular success. However, it has been possible and convenient to include aromatic moieties, such as benzene, toluene and/or xylenes, in the feed to this process. Thus the feed to this process can be defined as an aliphatic material having labile methyl groups, e.g. methanol, a methyl ether, a methyl thioether, etc. alone or admixed with unsubstituted or substituted, particularly methyl substituted benzene nuclei. Other materials may be admixed with the thus defined feed but these do not directly enter into the desired production of tetramethyl benzenes, particularly durene.

It is possible for a reaction mixture to be used which contains reactive components other than those defined above, which other reactants will be converted under the conditions of operation into intermediates which are themselves convertible into tetramethyl benzenes. For example, if the feed comprises a mixture of methanol and ethanol, both will be converted directly to aromatic hydrocarbons. Also, the methanol portion of the feed will be directly and indirectly through alkylation of in situ formed aromatic nuclei which will have been produced by ethanol conversion converted to durene, therefore indeed some of the ethanol will have been converted to tetramethyl benzenes. It should be noted, however, that non-methyl feed reactants are not converted to durene or other tetramethyl benzenes in any appreciable quantities if no methyl reactant is present. In this regard, it is also interesting to note that attempts to alkylate various substituted and unsubstituted preformed aromatic nuclei with ethanol and/or higher alcohols and/or ethers, etc. under the conditions set forth herein gave products in which tetramethyl benzenes were formed only to a very minor extent if at all.

As has been noted above, the instant process is specifically designed to produce tetramethyl benzenes by conversion of a suitable feed in contact with the particular type of aluminosilicate molecular sieve zeolite described herein at about 550° to 750°F and elevated pressures. At these operating conditions, tetramethyl benzenes have an equilibrium concentration of about 33 percent 1, 2, 4, 5, (durene) isomer, 51% 1, 2, 3, 5, (isodurene) isomer, and 16 percent 1, 2, 3, 4, (prehnitene) isomer - that is, the isodurene is the thermodynamically preferred isomer with durene comprising only about one-third of the mixture. It is therefore most surprising that carrying out the conversion of this invention in the effective presence of this type of zeolite catalyst at the recited high pressures produces a product in which the tetramethyl benzene fraction comprises more than 95 percent durene.

In this regard attention is directed to U.S. Pat. No. 2,945,899, issued July 19, 1960 in the name of Brown, et al. This patent is directed to a process in which a polyethyl benzene feedstock having an average of about 8.5 to 9.5 carbon atoms per molecule is reacted with a methylating agent such as methanol, dimethyl ether or methyl chloride at about 650° to 950°F in contact with a silica-alumina catalyst. Methanol is said to be reacted at 750° to 950°F and methyl chloride is said to be reacted at 650° to 750°F. Reaction pressure is said to be atmospheric to 500 psig but all examples and claims are at atmospheric pressure. It is to be noted that the disclosure of this reference is to be distinguished on the basis of the catalyst used. Although this reference discloses silica-alumina catalysts in general and although the catalyst claimed herein is a silica-alumina type of material, the instant process is unobvious from the reference because the instant catalyst has the peculiar ability to selectively produce durene in significantly greater than thermodynamic equilibrium concentrations (about 33% at 700°F) which is all that the reference shows. Further, the reference at best shows alkylation of existing preformed, co-fed alkylated aromatics and gives no clue as to the direct conversion of methanol to durene. Additionally, it is to be noted that the temperatures recited by the reference with respect to methanol alkylation are generally higher than those specified herein. Still further, there is no recognition in the reference of the major roll played by the pressure operating parameter as noted hereinabove.

Attention is also directed to U.S. Pat. No. 2,991,319 issued July 4, 1961 in the name of Mattox which is directed to the aromatization of oxirane and/or oxetane compounds by high temperature conversion in contact with zeolite catalysts. Reference is made to the production of durene and mesitylene as part of the aromatic product. There is no disclosure of the use of other than 3 and 4 membered alkylene oxide ring reactants nor of the production of durene in significant major quantities. It is interesting to note in this regard, that oxiranes are predominantly converted to aldehyde upon contact with the catalyst hereof at elevated temperature and atmospheric pressure under conditions similar to those conditions exemplified in this patent.

Understanding of this invention will be facilitated by reference to the following examples in which parts and percentages are by weight unless expressly stated to be on some other basis. These examples are illustrative only and in no way limiting upon the scope of this invention.

EXAMPLE 1

The catalyst used was 30 to 60 mesh H ZSM-5 (65%) in an alumina matrix which had been calcined and crushed.

A reactor tube was loaded with 5.93 parts by weight of catalyst and heated to 600°F. Methanol was heated to 600°F, and passed through this catalyst at a space velocity of 0.6 LHSV and atmospheric pressure. A product was removed which analyzed as:

| | |
|---|---|
| 2.63 % | unreacted methanol |
| 17.38 % | dimethyl ether |
| 56.08 % | steam |
| 0.10 % | $H_2$, CO and $CO$ |
| 14.67 % | aliphatics |
| 9.14 % | aromatics |

Of the aromatics, 20.19 percent was $C_{10}$ aromatics of which 78.9% was durene.

EXAMPLE 2

Example 1 was repeated increasing the reaction temperature to 700°F. The space velocity was 0.82 LHSV. The conversion to hydrocarbon products was 99.1 percent of which 36.2 percent was aromatics. The tetramethyl benzene content of the product was about 9.1 percent with a durene content of 98.6 percent.

This Example illustrates that increasing the reaction temperature does not significantly increase the durene content of the aromatic portion of the product but that it does increase the aromatic portion of the product.

EXAMPLE 3

Example 2 was repeated except that the reaction was carried out at 5 atmospheres pressure and a space velocity of 1.22 LHSV.

The conversion to hydrocarbons was about the same, 97.3 percent as was the aromatic proportion of the hydrocarbon product, 35.7 percent. The tetramethyl benzene content increased slightly to 12.7 percent to which 98 percent was durene.

EXAMPLES 4 - 9

These Examples were run as was Example 2. Modified operating parameters and results are reported in the following Table.

TABLE

| Example No. | 4 | 5 | 6 | 7 | 8 | 9 |
|---|---|---|---|---|---|---|
| Pressure (Atm.) | 12.5 | 25 | 33.3 | 50 | 50 | 50 |
| LHSV | 1.22 | 1.22 | 0.82 | 1.22 | 1.22 | 30.6 |
| Conversion (%) | 97.3 | 97.2 | 98.2 | 99.0 | 97.2 | 68.0 |
| Aromatic Product (% of hydrocarbon product) | 37.9 | 45.5 | 36.5 | 34.8 | 34.9 | 29.7 |
| Tetramethyl Benzene (%) in aromatic product | 25.5 | 28.0 | 63.6 | 59.0 | 45.0 | 43.5 |
| Durene Content of tetramethyl benzenes (%) | 97.8 | 95.8 | 99.3 | 99.4 | 99.2 | 99.3 |

These Examples show that increasing reaction pressure increases the production of tetramethyl benzenes principally at the expense of aliphatics and $C_7$ to $C_9$ aromatics. They also show that the durene proportion of the tetramethyl benzenes product is a function of the shape selectivity of the particular catalyst used. Therefore, the combination of this catalyst shape selectivity for durene (from among the tetramethyl benzenes) and this elevated pressure selectivity for tetramethyl benzenes, leads to high durene production ratio.

EXAMPLES 10 and 11

These Examples show the substantial inability of the process of this invention to convert other chemical feeds to durene even though companion applications to this one indicate that they are excellent feeds for ZSM-5 type catalytic aromatization. The catalyst used was the same as in Example 2.

TABLE

| Example No. | 10 | 11 |
|---|---|---|
| Feed | Ethanol | Acetone |
| Temperature, °F | 700 | 700 |
| Pressure, atm. | 50 | 50 |
| LHSV, $hr^{-1}$ | 1.22 | 1.22 |
| % Conversion | 98.5 | 99.8 |
| Hydrocarbon Product Distribution, wt. % | | |
| $C_1$ | .12 | .07 |
| $C_2$ | 1.80 | .12 |
| $C_3$ | 7.58 | 2.23 |
| $C_4$ | 17.34 | 5.27 |
| $C_5^+$non-aromatics | 40.16 | 8.44 |
| Benzene | .62 | .77 |
| Toluene | 3.88 | 7.30 |
| $C_8$ Aromatics | 8.97 | 20.74 |
| $C_9$ Aromatics | 11.57 | 36.44 |
| $C_{10}^+$ Aromatics | 6.95 | 16.09 |
| % Total Aromatics in Hydrocarbon product | 32.98 | 83.87 |
| Wt. % Durene in Aromatics | .85 | 2.72 |

EXAMPLES 12 and 13

These Examples were carried out in the same manner as Example 2 except that the feed was a mixture of 67.23% methanol and 32.77 percent preformed benzene. At a pressure of 25 atm., a space velocity of 0.82 LHSV and a conversion of 99.7 percent, the hydrocarbon product contained 82.3% aromatics of which 28.5 percent was tetramethyl benzenes, substantially all durene.

EXAMPLE 14

Example 12 was rerun at 800°F. The conversion was about 96 percent. The hydrocarbon product was 83.25 percent aromatics of which 13.59 percent was tetramethyl benzenes and only 7.2 percent durene. This Example illustrates the loss of shape selectivity for the durene isomer at higher temperatures as well as the loss of selectivity for tetramethyl benzenes in general (16.45 percent) under these conditions.

EXAMPLES 15 - 17

These Examples show the conversion of dimethyl ether according to this invention. The catalyst used was the same as in Example 2.

TABLE

| Example No. | 15 | 16 | 17 |
|---|---|---|---|
| Temperature °F | 700 | 700 | 700 |
| Pressure (Atm.) | 5.5 | 25 | 50 |
| Space Velocity (WHSV) | 1.44 | 1.44 | 1.44 |
| Conversion (%) | 99.2 | 99.3 | 98.0 |
| Hydrocarbon Products Distribution (%) | | | |
| $C_4^-$ Aliphatics | 28.84 | 26.40 | 25.44 |
| $C_5^+$ Aliphatics | 33.83 | 37.18 | 35.12 |

TABLE-Continued

| | | | |
|---|---|---|---|
| Benzene | 0.96 | 0.87 | 0.79 |
| Toluene | 4.69 | 2.50 | 1.46 |
| $C_8$ Aromatics | 12.33 | 8.55 | 6.28 |
| $C_9$ Aromatics | 12.25 | 12.06 | 11.98 |
| $C_{10}$ Aromatics | 7.10 | 12.44 | 18.86 |
| Diethyl benzene | 1.20 | 1.04 | 0.95 |
| Dimethyl ethyl benzene | 1.78 | 1.70 | 1.59 |
| Tetramethyl benzenes | 3.77 | 9.31 | 15.58 |
| 1,2,4,5, (durene) | 3.77 | 9.31 | 15.58 |
| 1,2,3,5 | — | — | — |
| 1,2,3,4 | — | — | — |

EXAMPLES 18 - 21

In the following Examples, each of the noted catalysts was used to catalyze the conversion of methanol at 700°F and 1 LHSV and at 1 atm pressure. It is to be noted that the proportion of durene formed in each case is higher than the equilibrium concentration of this isomer (about 33 percent) under the specified conditions, although in all cases less than 4 percent by weight of the total hydrocarbon consisted of tetramethyl benzenes. Examples 19, 20 and 21 show that the designated catalyst possess the requisite selectivity for use at the higher pressures of this invention.

TABLE

| Example No. | Catalyst | % durene in tetramethyl benzene fraction of the product |
|---|---|---|
| 18 | H ZSM-5 | 50.1 |
| 19 | H ZSM-11 | 84.0 |
| 20 | HZSM-21 | 73.5 |
| 21 | TEA Mordenite | 78.7 |

What is claimed is:

1. In the process of converting an aromatizable hetero organic compound feed to aromatic hydrocarbons by contacting such with an aluminosilicate crystalline zeolite molecular sieve having a silica to alumina ratio of at least about 12 and a constraint index of about 1 to 12 at elevated temperatures up to about 850°F; the improvement, whereby maximizing durene production from said process, which comprises selecting a feed comprising compounds of the formula $CH_3 - X$ wherein X is hydroxyl, alkoxy, thiol, alkylthio, amine, alkyl amine, dialkyl amine, halo or cyano; and carrying out the conversion at at least about 550°F and 20 atmospheres.

2. The improved process claimed in claim 1 wherein said pressure is about 20 to 200 atmospheres.

3. The improved process claimed in claim 1 wherein said pressure is about 30 to 60 atmospheres.

4. The improved process claimed in claim 1 wherein said temperature is about 600° to 700°F.

5. The improved process claimed in claim 1 wherein said feed comprises methanol.

6. The improved process claimed in claim 1 wherein said feed consists essentially of methanol.

7. The improved process claimed in claim 1 including resolving the product of said conversion into durene, non-durene containing higher aromatics, $C_5$ to 400°F, and lighter products, and recycling said higher aromatics to said conversion.

8. The improved process claimed in claim 1 wherein said aluminosilicate crystalline zeolite molecular sieve is ZSM-5.

* * * * *